United States Patent
Cedergaard et al.

(10) Patent No.: US 7,255,123 B2
(45) Date of Patent: Aug. 14, 2007

(54) DEVICE FOR DIVIDING A STREAM OF PARTICULATE OR PULVERULENT MATERIAL INTO SUBSTREAMS

(75) Inventors: Niels Ole Cedergaard, Mariager (DK); Mogens Juhl Föns, Fårup (DK)

(73) Assignee: F. L. Smidth A/S, Valby (DK)

( * ) Notice: Subject to any disclaimer, the term of this patent is extended or adjusted under 35 U.S.C. 154(b) by 155 days.

(21) Appl. No.: 10/537,740

(22) PCT Filed: Feb. 25, 2004

(86) PCT No.: PCT/IB2004/000689

§ 371 (c)(1), (2), (4) Date: Jun. 8, 2005

(87) PCT Pub. No.: WO2004/101402

PCT Pub. Date: Nov. 25, 2004

(65) Prior Publication Data

US 2006/0243325 A1    Nov. 2, 2006

(30) Foreign Application Priority Data

May 14, 2003    (DK) ............................... 200300729

(51) Int. Cl.
*E03B 11/00*    (2006.01)
(52) U.S. Cl. ................. 137/262; 137/561 A; 73/863.45
(58) Field of Classification Search ............... 137/262, 137/561 A; 73/863.45
See application file for complete search history.

(56) References Cited

U.S. PATENT DOCUMENTS 1,208,373 A * 12/1916 Rhodes ..................... 137/262
3,423,913 A *  1/1969 Mecklin .................. 137/561 R
4,549,567 A * 10/1985 Horton ..................... 137/262

FOREIGN PATENT DOCUMENTS

DE         78952       1/1971
DE    29 33 291 A1     3/1981

* cited by examiner

*Primary Examiner*—Kevin Lee
(74) *Attorney, Agent, or Firm*—Jeffrey S. Melcher; Manelli Denison & Selter, PLLC

(57) ABSTRACT

The invention Described is a device (1) for dividing a stream of particulate or pulverulent material into at least two substreams. The device has a housing (2) with a substantially vertical inlet duct (3) and two or more outlet ducts (4, 5, 6, 7) emanating from separate openings, and being separated by partition walls (9) extending radially relative to the centreline of the inlet duct (3). The device also has a rotor 11) which is located in immediate extension of the inlet duct (3), with its axis of rotation coinciding with the centreline (10) of the inlet duct. The rotor (11) has a radially configured surface (11*a*) for directing the falling material stream radially outwards into the free space (12) above the outlet ducts. The device is peculiar in that the radial partition walls (9) can be adjusted in the circumferential direction. The result will be a freely variable ratio between an arbitrary number of outlet substreams.

4 Claims, 1 Drawing Sheet

A-A

Figure 1:
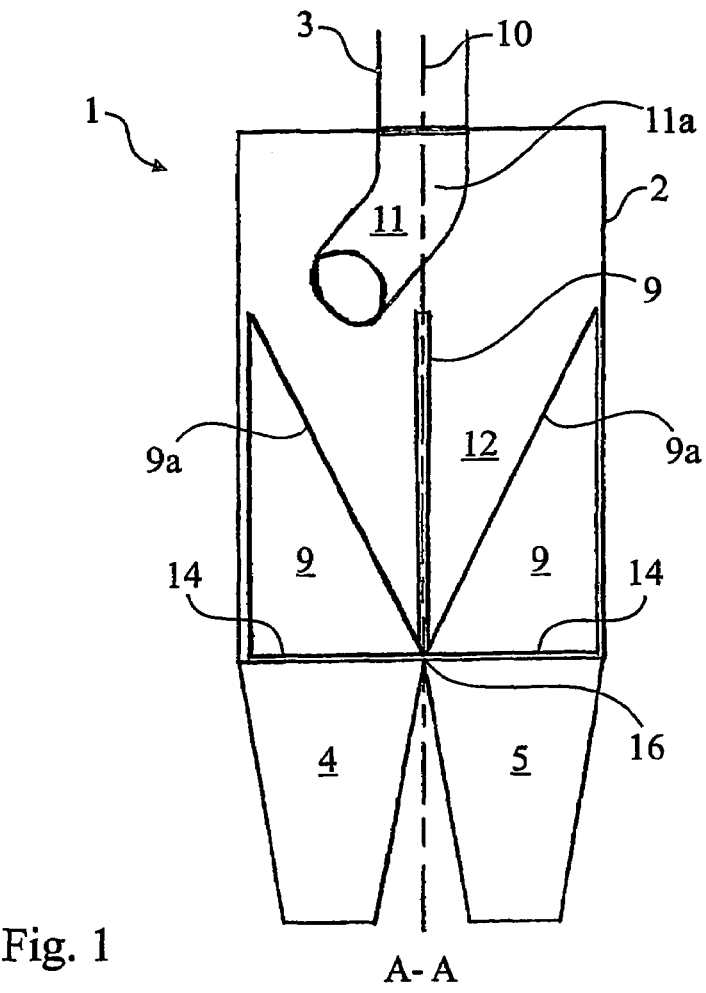

DEVICE FOR DIVIDING A STREAM OF PARTICULATE OR PULVERULENT MATERIAL INTO SUBSTREAMS

The present invention relates to a device for dividing a stream of particulate or pulverulent material into at least two substreams, said device comprising a housing with a substantially vertical inlet duct and two or more outlet ducts emanating from separate openings, and being separated by means of partition walls extending radially relative to the centreline of the inlet duct, and a rotor which is located in immediate extension of the inlet duct, with its axis of rotation coinciding with the centreline of the inlet duct, said rotor having a radially configured surface for directing the falling material stream radially outwards into the free space above the outlet ducts.

A device of the aforementioned kind is known from DE 295 00 305 U1. This known device is designed for dividing a material stream into several substreams according to a predetermined distribution ratio. The device may comprise radial partition walls, with the mutual circumferential distance of these partition walls being the main determinant of this predetermined distribution ratio. The disadvantage of this known device is that the distribution ratio between the individual substreams is not directly variable on a continuous basis during operation, but will as a minimum necessitate a temporary shutdown of operation. For example, from the viewpoint of process optimization, the provision of such means allowing for continuous variability of the distribution ratio would be desirable.

It is the objective of the present invention to provide a device for dividing a material stream into several substreams whereby the aforementioned disadvantage is remedied.

According to the invention this is achieved by means of a device of the kind mentioned in the introduction, and being characterized in that the radial partition walls can be adjusted in the circumferential direction.

The result will be a freely variable ratio between an arbitrary number of outlet substreams.

The partition walls may be configured in any suitable manner. In one embodiment they may thus be formed as a roof ridge with inclined surfaces sloping towards separate outlet ducts, being displaceable in the circumferential direction.

It is, however, preferred that the partition walls are made up of plates, with each plate pivotally mounted around its separate radial axis. In this embodiment, each of the plates may be pivotally mounted at its lower side edge so that each plate is pointing upwards into the free space above the outlet ducts and being displaceable in the transverse direction by angular turning of the plate. Hence the one free end edge of each of the plates will constitute the knife edge of each of the partition walls, where the mutual distance between the knife edges will, due to the angular turning of the plates, be the main determinant of the distribution ratio between the substreams.

In an advantageous embodiment the aforementioned free end edge or knife edge of each of the plates is configured so that it virtually proceeds through the point where the axes of rotation of the plates intersect the axis of rotation of the rotor. Hence two adjacent plates can be angularly adjusted so that their knife edges bear against one another, entailing complete shutting-off of the underlying outlet duct. Furthermore, in this embodiment the knife edges will intersect the material stream under the same angular span viewed from the top, regardless of how far the material is ejected into the free space by the rotor.

Figure 2:
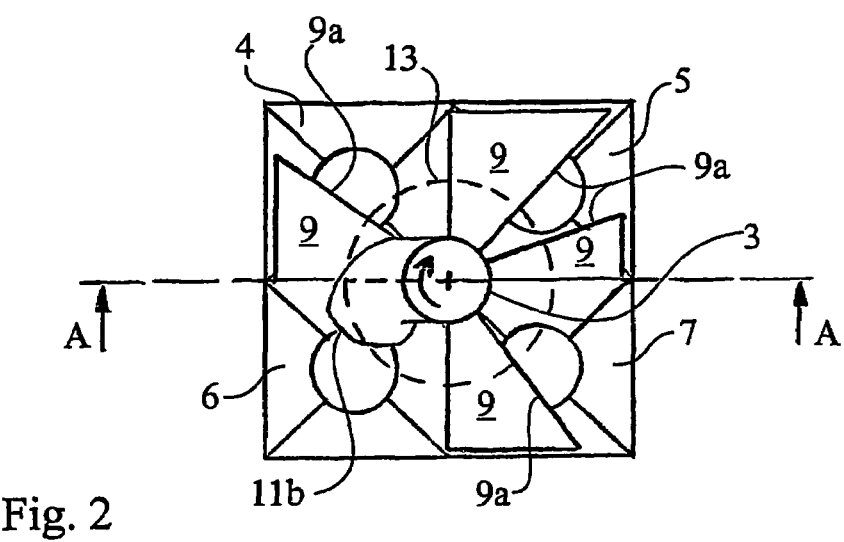

The invention is described in further details in the following with reference to the drawing, being diagrammatic, and where FIG. 1 shows partly as a sectional view a side view of a preferred embodiment of the device according to the invention, and FIG. 2 shows the device shown in FIG. 1 viewed from above.

In FIGS. 1 and 2 is shown a preferred embodiment for a device 1 according to the invention. The device 1 comprises a housing 2 with an inlet duct 3 and four outlet ducts 4, 5, 6 and 7, emanating from separate openings, and being separated by means of partition walls 9 extending radially relative to the centreline 10 of the inlet duct. The device 1 also comprises a rotor 11 which is fitted in immediate extension of the inlet duct 3, with its axis of rotation coinciding with the centreline of the inlet duct. The rotor 11 comprises a radially proceeding pipe section 11a which during the operation of the device directs the falling material stream radially outwards into the free space 12 above the outlet ducts. The rotor 11 also comprises an outermost pipe section 11b, which, viewed in the rotational direction of the rotor, is pointing backward in a partially tangential direction. Hence, the rotor 11 will rotate solely on the strength of the impulse imparted from the falling material. As indicated in FIG. 2 at the dotted circle 13 the material will be ejected into the free space 12 along a circular path, the radius of which is dependent on the rotational speed of the rotor and hence, in the shown embodiment, the volume flow through the pipe. The rotor 11 may alternatively be driven by means of a motor, not shown.

In order to divide the material stream leaving the rotor 11 into four substreams with a mutually variable volume ratio, the radial partition walls 9 are made up of plates each of which is pivotally mounted about its separate radial axis 14, thus being adjustable in the circumferential direction. As is apparent from the drawing, the plates 9 are pivotally mounted at their lower side edges so that the plates 9 point upwards into the free space 12 above the outlet ducts and being displaceable in the transverse direction by angular turning of the plates 9. Hence, the one free end of each of the plates 9 constitute the knife edges 9a of the partition walls, where the mutual distance between the knife edges will, due to the angular turning of the plates, be the main determinant of the distribution ratio between the substreams.

In the shown embodiment, the free end edge or knife edge 9a of each of the plates 9 is configured so that it virtually extends through a point 16, where the axes of rotation of the plates 9 intersect the axis of rotation 10 of the rotor. Hence, two adjacent plates 9 can be angularly turned so that their knife edges 9a bear against one another, thereby completely shutting off the underlying outlet duct. Furthermore, in this embodiment the knife edges will intersect the material stream at the same angular span viewed from the top, regardless of how far the material is ejected into the free space by the rotor.

The angular turning of the plates 9 may in a simple embodiment be done manually by means of a handle, not shown, fixed to the shafts 14, but may also be done automatically by means of remote-controlled means, not shown.

In the shown embodiment, the housing 2 has a substantially quadratic cross-section. The invention is not limited to this embodiment and the housing 2 may thus assume any appropriate form, whether circular, polygonal etc.

In actual practice, the exact configuration of the device will depend on the specific requirements which apply for dividing the material stream. These requirements will typically relate to the number of substreams into which the material is to be divided, the distribution ratio between the substreams, and the intervals within which it must be possible to regulate the individual substreams.

The device shown on the drawing comprises a total of four outlet ducts which are separated by means of four adjustable plates 9. When all plates 9 are in vertical position, as shown in FIG. 1, the material stream will be divided into four substreams, each constituting 25 percent of the total stream. In FIG. 2 all the plates 9 are shown in a position which is angularly turned away from the vertical position. In the shown embodiment, one substream may be reduced to 0% by altering the angular position of the two plates 9, constituting the boundary against the respective outlet duct, across this outlet duct, thus blocking completely the duct for fall-through of material so that the material will be directed to the two adjacent outlet ducts. In similar fashion, a substream can be increased to 50 per cent by altering the angular position of the two plates 9 forming the boundary against the respective outlet duct across the two adjacent outlet ducts, thereby partially blocking these ducts for fall-through of material so that instead the material is diverted to the mentioned outlet duct.

In certain instances, it will be desirable to divide the material stream into only three substreams, of which it must be possible to regulate one substream within the range 0-100% and to regulate the two other substreams within the range 0-50%. If this is the case, two outlet ducts can be converged to form one single duct. For example, this may be accomplished by using the device indicated on the drawing, where two diagonally opposed outlet ducts, such as for example the outlet ducts 4 and 6, are converged into one single duct.

The invention claimed is:

1. Device for dividing a stream of particulate or pulverulent material into at least two substreams, said device comprising:
    a housing with a substantially vertical inlet duct and two or more outlet ducts emanating from separate openings, and being separated by means of partition walls extending radially relative to the centreline of the inlet duct; and
    a rotor which is located in immediate extension of the inlet duct, with its axis of rotation coinciding with the centreline of the inlet duct, said rotor having a radially configured surface for directing the falling material stream radially outwards into the free space above the outlet ducts, wherein the radial partition walls can be adjusted in the circumferential direction.

2. Device for dividing a stream of particulate or pulverulent material into at least two substreams, said device comprising:
    a housing with a substantially vertical inlet duct and two or more outlet ducts emanating from separate openings, and being separated by means of partition walls extending radially relative to the centreline of the inlet duct; and
    a rotor which is located in immediate extension of the inlet duct, with its axis of rotation coinciding with the centreline of the inlet duct, said rotor having a radially configured surface for directing the falling material stream radially outwards into the free space above the outlet ducts, wherein the radial partition walls can be adjusted in the circumferential direction and wherein the partition walls are made up of plates, with each plate pivotally mounted around its separate radial axis.

3. Device according to claim 2, wherein each of the plates is pivotally mounted at its lower side edge so that each plate is pointing upwards into the free space above the outlet ducts and being displaceable in the transverse direction by angular turning of the plate.

4. Device according to claim 2, wherein the a free end edge or knife edge of each of the plates is configured so that the free end edge or knife edge virtually proceeds through the point where the axes of rotation of the plates intersect the axis of rotation of the rotor.

* * * * *